(12) United States Patent
Nakanishi et al.

(10) Patent No.: US 6,734,932 B2
(45) Date of Patent: May 11, 2004

(54) OPTICAL DIFFUSING PLATE, OPTICAL ELEMENT AND LIQUID CRYSTAL DISPLAY

(75) Inventors: Sadahiro Nakanishi, Ibaraki (JP); Minoru Miyatake, Ibaraki (JP); Shusaku Nakano, Ibaraki (JP); Amane Mochizuki, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/041,829

(22) Filed: Jan. 7, 2002

(65) Prior Publication Data

US 2002/0140881 A1 Oct. 3, 2002

(30) Foreign Application Priority Data

Jan. 16, 2001 (JP) ........................................ 2001-008006

(51) Int. Cl.$^7$ ............................................. G02F 1/1335
(52) U.S. Cl. ........................ 349/112; 359/494; 359/500
(58) Field of Search ........................ 349/112; 359/494, 359/500

(56) References Cited

U.S. PATENT DOCUMENTS 5,825,543 A * 10/1998 Ouderkirk et al. .......... 359/494

6,517,914 B1 * 2/2003 Hiraishi ...................... 428/1.1

FOREIGN PATENT DOCUMENTS

| EP | 0 952 477 A1 | 10/1999 |
| JP | 11-174211 | 7/1999 |
| JP | 2000-187104 | 7/2000 |
| JP | 2001-213919 | 8/2001 |
| JP | 2001-354732 | 12/2001 |
| WO | WO 87/0182 | 3/1987 |

* cited by examiner

Primary Examiner—Toan Ton
Assistant Examiner—David Chung
(74) Attorney, Agent, or Firm—Knobbe Martens Olson & Bear LLP (57) ABSTRACT

An optical diffusing plate that gives a anisotropic scattering of a linearly polarized light and has an excellent diffusion property in a scattering direction, and that is suitable for improving visibility, brightness of a liquid crystal display, comprising a birefringent film and a minute domain with a birefringent characteristic different from the birefringent film in a dispersed state in the birefringent film, the birefringent film comprises a birefringent stretched film, and the minute domain comprises a positive uniaxial liquid crystal polymer, wherein a length of the minute domain in a direction of stretching axis is longer than a length in a direction orthogonal to the stretching axis, and the liquid crystal polymer is aligned perpendicularly to a stretching axis of the birefringent stretched film.

11 Claims, 2 Drawing Sheets

OPTICAL DIFFUSING PLATE, OPTICAL ELEMENT AND LIQUID CRYSTAL DISPLAY

BACKGROUND OF THE INVENTION

1. Field of the Invention

The present invention relates to an optical diffusing plate that gives an anisotropic scattering of a linearly polarized light and has an excellent diffusion property in a scattering direction, and that is suitable for improving visibility, brightness etc. of a liquid crystal display etc. Moreover, the present invention relates to an optical element using the optical diffusing plate concerned.

2. Description of the Prior Art

Conventionally, an optical diffusing plate designed so that anisotropic scattering might be given to a linearly polarized light by making a domain with a refractive index anisotropy contained in a dispersed state in a base material has been known. As the optical diffusing plate concerned; an optical diffusing plate that comprises a combination of a thermoplastic resin and a low molecular weight liquid crystal, that comprises a combination of a low molecular weight liquid crystal and a photo-curable low molecular weight liquid crystal and that comprises a combination of a polyvinyl alcohol and a low molecule liquid crystal, have been known (U.S. Pat. No. 2,123,902 specification, WO 87/01822 official gazette, JP-A 9-274108).

What is expected in the above-mentioned optical diffusing plate is that supplying a linearly polarized light in a state difficult to be absorbed by a polarizing plate reduces an absorption loss, and consequently the brightness of a liquid crystal display is improved. It is expected using this method that the following conventional problems may be solved; a problem based on a large wavelength dependability of a cholesteric liquid crystal in the conventional absorption loss reduction systems in which a cholesteric liquid crystal layer and a quarter wavelength plate are used, and especially, problems that transmitted light is chromic from oblique direction and that these cannot be applied to a reflected type liquid crystal display etc. However, in the above-mentioned conventional optical diffusing plate, there were problems of a difficulty in manufacturing, and of a practical usability in difficult handling with a poor functional stability, when applied in a liquid crystal display, etc.

As an optical diffusing plate in which the above-mentioned problem was solved, an optical diffusing plate using a birefringent film that contains minute domains with different birefringent characteristics in a dispersed state is proposed (JP-A 2000-187105). When this optical diffusing plate is used, the above-mentioned problem is solved and moreover excellent polarization characteristics may be demonstrated. However, in existing optical diffusing plates in which a birefringent film containing a minute domain in a dispersed state is used, each of the above-mentioned minute domain is aligned in the stretching direction of a stretched birefringent film, and a minute domain perpendicularly aligned to the stretching direction is not obtained.

SUMMARY OF THE INVENTION

An object of the present invention is to provide an optical diffusing plate with excellent thermal and chemical stability and practical usability, using a birefringent film containing minute domains in a dispersed state having different birefringent characteristics, easily manufactured, wherein a linearly polarized light that may reduce an absorption loss by a polarizing plate may be supplied and an improvement in brightness is expected and at the same time a chromatic problem may not be induced, and the optical diffusing plate is applicable to a reflected type liquid crystal display etc., further wherein a minute domain is aligned perpendicularly to the stretching direction of a stretched birefringent film. And another object of the present invention is to provide an optical element using the above-mentioned optical diffusing plate and further a-liquid crystal display using the same.

As a result of repeated examinations carried out wholeheartedly by the present inventors to solve the above-mentioned problems, it was found out that the above-mentioned object might be attained and the present invention was completed using an optical diffusing plate shown below.

Namely, the present invention relates to an optical diffusing plate comprising a birefringent film and a minute domain with a birefringent characteristic different from the birefringent film in a dispersed state in the birefringent film, wherein the birefringent film comprises a birefringent stretched film, and the minute domain comprises a positive uniaxial liquid crystal polymer, further wherein a length of the minute domain in a direction of stretching axis-is longer than a length in a direction orthogonal to the stretching axis, and the liquid crystal polymer is aligned perpendicularly to a stretching axis of the birefringent stretched film.

Since the minute domain and the birefringent stretched film that contains the minute domain in a dispersed state is formed by a polymer material, the resulting forming material has an excelled handling and is easily manufactured using the optical diffusing plate of the present invention. Moreover, since the forming material has a thermal and chemical stability, it demonstrates stable optical function and excels also in practicality. Moreover, the minute domain is formed by a positive uniaxial liquid crystal polymer and the liquid crystal polymer is perpendicularly aligned on an interface to a base material polymer, and therefore a state is given in which the liquid crystal polymer as a whole is aligned perpendicularly to the stretching axis of the birefringent stretched film because this minute domain is extended in a direction of stretching axis based on stretching of a base material film. Such a state is preferable at a point that a control of a refractive index in a three-dimensional direction is attained unlike in the birefringent film described in the publication of JP-A 2000-187105.

In the above-mentioned optical diffusing plate, it is preferable that the positive uniaxial liquid crystal polymer is a side chain type liquid crystal polymer comprising a monomer unit (a) containing liquid crystalline fragment side chain and a monomer unit (b) containing non-liquid crystalline fragment side chain.

In the above-mentioned optical diffusing plate, a minute domain is distributed in a dispersed state caused by phase separation, and it is preferable that the length in the direction of stretching axis of the minute domain is from 0.05 to 500 µm.

Although the above-mentioned optical diffusing plate may be used as one layer, two or more layers may be used in laminated state so that the Δnl direction of an upper layer and a lower layer may have a mutually parallel relationship in order to increase polarization characteristics.

Moreover, the present invention relates to an optical element comprising a laminated layer of at least one kind selecting from a polarizing plate and a retardation plate, and the above-mentioned optical diffusing plate.

Furthermore, the present invention relates to a liquid crystal display comprising the above-mentioned optical diffusing plate or the above-mentioned optical element on one side or both sides of liquid crystal cells.

When the above-mentioned polarizing plate is used, an amount of the transmitted linearly polarized light is increased and an absorption loss is reduced simultaneously, and the brightness of a transmitted type liquid crystal display etc. may be enhanced. Moreover, a possible chromatic problem based on high wavelength dependability as in cholesteric liquid crystal becomes rarely to be induced. Furthermore, the above-mentioned polarizing plate is easily-applicable also in a reflected type liquid crystal display etc., and a liquid crystal display with outstanding brightness and visibility may be stably obtained.

DETAILED DESCRIPTION OF THE INVENTION

An optical diffusing plate of the present invention comprises a minute domain contained in dispersed state in a birefringent film having different birefringent characteristics from the birefringent film, and the birefringent film comprises a birefringent stretched film. At the same time the minute domain comprises a positive uniaxial liquid crystal polymer, and the liquid crystal polymer is aligned perpendicularly to a stretching axis of the birefringent stretched film.

Figure 1:
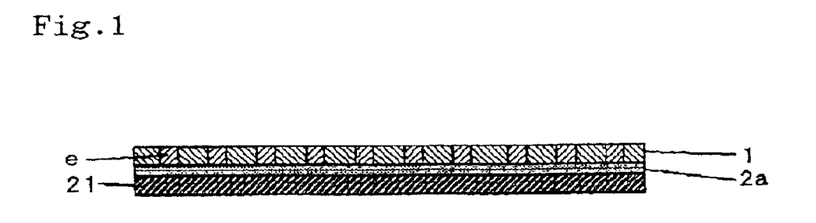
FIG. 1 is a sectional view of an example of an optical diffusing plate.
Figure 2:
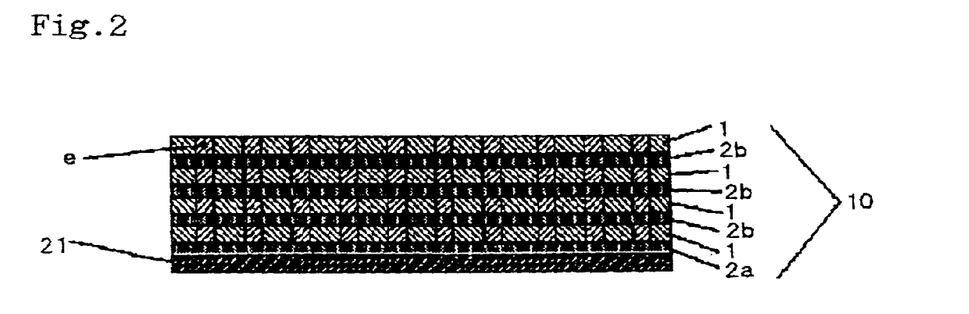
FIG. 2 is a sectional view of an example of a laminated optical diffusing plate.

Examples of optical diffusing plates of the present invention are shown in FIG. 1 and FIG. 2. Notation 1 shows an optical diffusing plate and 10 shows a laminated optical diffusing plate in which the optical diffusing plates 1 are laminated together. Each optical diffusing plate is a birefringent film that contains minute domains e in a dispersed state having different birefringent characteristics from each other. In addition, notation 2b shows an adhesive layer between laminated optical diffusing plates, 2a an adhesive layer that comprises an adhesive layer for an adherend, and 21 a separator that covers adhesive layer temporarily.

The optical diffusing plate of the present invention is manufactured by a suitable method, for example, as follows: a film is formed from a mixture of one kind or two kinds or more of base material polymers used as a base material of a birefringent film and one kind or two kinds or more of the above-mentioned positive uniaxial liquid crystal polymers used as a minute domain, and subsequently this film is aligned through stretching processing to obtain a minute domain of the liquid crystal polymer formed in the birefringent film having different birefringent characteristics from the birefringent film.

Suitable transparent polymer may be used as the above-mentioned base material polymer, and there is especially no limitation. As examples of the polymer, for example; polyester series polymers such as polyethylene terephthalate or polyethylene naphthalate; styrene series polymers such as polystyrene or acrylonitrile styrene copolymer (AS resin) olefin series polymers such as poly olefin which include polyethylene, polypropylene, cyclo-series, or norbornene structure, or ethylene propylene copolymers; carbonate series polymers; acrylics series polymers such as poly methylmethacrylate; vinyl chloride series polymers; cellulose series polymer such as cellulose diacetate or cellulose triacetate; amide series polymers such as nylon or aromatic polyamide; imide series polymers; sulfone series polymers; polyether sulfone series polymers; polyether ether ketone series polymers; polyphenylene sulfide series polymer; vinyl alcohol series polymer; vinylidene chloride series polymer; vinyl butyral series polymers; allylate series polymers; and poly oxy methylene series polymers; or blended mixtures of the above described polymers may be mentioned. Polymers, above all, comprising hydrocarbon without any polar group as ester group, ether group and carbonate group are preferable.

On the other hand, as a positive uniaxial liquid crystal polymer, for example, a side chain type liquid crystal copolymer comprising a monomer unit (a) containing liquid crystalline fragment side chain and a monomer unit (b) containing non-liquid crystalline fragment side chain may be mentioned.

As a fragment side chain in the above-mentioned monomer unit (a), for example, a side chain that has side chain part represented by a general formula (1): —Y—Z—A (where, Y represents a poly methylene chain or poly oxy methylene chain branched from main chain, and Z represents para-substituted cyclic compounds), may be mentioned.

In the above-mentioned general formula (1), Y represents a spacer group that gives flexibility, and comprises poly methylene chain —$(CH_2)_p$— or poly oxy methylene chain —$(CH_2CH_2O)_q$—. The numbers p and q of repetitions are suitably determined by chemical structure of mesogenic group Z bonded with it etc., and, generally p is an integer of 0 to 20, preferably, 2 to 12, and q is an integer of 0 to 10, preferably 1 to 4.

As a preferable spacer group Y to form a birefringent film for controlling refractive index, for example, ethylene, propylene, butylene, pentylene, hexylene, octylene, decylene, undecylene, dodecylene, octadecylene, ethoxy ethylene, and methoxy butylene, etc. may be mentioned.

Z is para-substituted cyclic compound serving as mesogenic group that gives liquid crystal alignment, as examples of para-substituted aromatic unit and para-sustituted cyclohexyl ring unit, such as types of compounds; azomethyne type, azo type, azoxy type, ester type, tolane type, phenyl type, biphenyl type, phenyl cyclo hexyl type and bicylcohexyl type may be mentioned.

As a preferable para-substituted cyclic compound Z to form a birefringent film for controlling refractive index, compounds represented by following [Formula 1] may be mentioned.

[Formula 1]

(Where m is 1 or 2.) In the above formulas, a spacer group Y and a mesogenic group Z may be bonded through ether linkage, i.e., —O—. Moreover, one or two hydrogen of phenyl group that forms para-substituted cyclic compound may be substituted by halogen, and in this case as a halogen chlorine or fluorine is preferable.

Moreover, terminal substituent group A in para-position of para-substituted cyclic compound Z may be suitable group, and for example; cyano group, alkyl group, alkenyl group, alkoxy group, oxa alkyl group, halogen group and haloalkyl group, haloalkoxy group, and haloalkenyl group with which one or more of hydrogen are substituted by fluorine or chlorine may be mentioned.

Therefore, the above-mentioned side chain type liquid crystal copolymer may be a copolymer that shows thermoplasticity and proper alignment, such as nematic phase and smectic phase, at room temperature or higher temperature.

In the fragment side chain in the above-mentioned monomer unit (a), it is preferable that at least one substituent selected from a group of alkoxy group, cyano group, fluoro group, and alkyl group is contained in a parallel direction (symmetrically) to a molecule length axis of the fragment side chain.

As the above-mentioned monomer unit (a), a monomer unit represented by the general formula (a): [Formula 2], for example, is mentioned as a preferable example.

[Formula 2]

(Where, $R^1$ represents hydrogen atom or methyl group; a represents a positive integer of 1 to 6; $X^1$ represents —$CO_2$- group or —OCO-group; $R^2$ represents cyano group, alkoxy group with 1 to 6 of carbon, fluoro group, or alkyl group with 1 to 6 of carbon; and b and c represents integer of 1 or 2, respectively.

Moreover, the fragment side chain in the above-mentioned monomer unit (b) preferably has at least one substituent selected from a group of alkyl group, fluoro alkyl group, and alkoxy group. Control of refractive index characteristics and birefringent characteristics becomes possible using the monomer unit that has the fragment side chain with such a substituent.

As the above-mentioned monomer unit (b), a monomer unit represented by a general formula (b): [Formula3], for example, may be mentioned.

[Formula 3]

$$-\!\!+\!\!CH_2-\underset{\underset{CO_2-R^4}{|}}{\overset{\overset{R^3}{|}}{C}}\!\!+\!\!-$$

(Where, $R^3$ represents hydrogen atom or methyl group, $R^4$ represents alkyl group with 1 to 22 of carbon, fluoro alkyl group with 1 to 22 of carbon, or a substituent represented by a general formula (c): [Formula 4]).

[Formula 4]

$$-\!\!+\!\!CH_2 \cdot CH_2-O\!\!+\!\!_d R^5$$

(Where, d represents a positive integer of 1 to 6 and $R^5$ represents alkyl group with 1 to 6 of carbon.) A monomer unit that has such a linear side chain and is represented by a general formula (b) is preferable in controlling refractive index characteristics and birefringent characteristics. An ordinary ray refractive index may be decreased, and at the same time birefringence may be decreased by increasing a percentage of monomer unit represented by the general formula A percentage of the monomer unit (a) and the monomer unit (b) is not especially limited. The percentage should be varied depending on a kind of the monomer unit, the preferable percentages of the monomer unit are (b)/{(a)+(b)}=0.01 to 0.8 (molar ratio), since increase in the percentage of the monomer unit (b) impairs development of birefringent characteristics of a side chain type liquid crystal copolymer. Moreover, it is preferable that a weight average molecular weight of a side chain type liquid crystal polymer is 2000 to 100000. In addition, a side chain type liquid crystal copolymer comprising the monomer units represented by the above described formulas [Formula 2] and [Formula 3] as a monomer unit (a) and a monomer unit (b) may be prepared by copolymerizing an acrylics series monomer or a methacryl series monomer corresponding to the monomer units of the above-mentioned illustration.

A case of poly acrylate or poly methacrylate was illustrated for a side chain type liquid crystal copolymer in the above-mentioned description as a frame structure that forms main chain, a main chain of the present invention may be formed with proper combination of chains, such as linear, branched, or cyclic. As examples; poly alpha-haloacrylates, poly alpha-cyano acrylates, poly acrylamides, polyacrylonitriles, poly methacrylonitriles, polyamides, polyesters, polyurethanes; polyethers, polyimides, and polysiloxanes may be mentioned.

In the above method, a base material polymer and the above-mentioned liquid crystal polymer preferably are used in combination wherein a phase separation is induced, in order that a minute domain formed in the optical diffusing plate obtained may develop excellent dispersibility and distribution property. Thus the dispersibility and distribution property may be controlled by a combination of those compatibilities. Phase separation may be obtained using suitable methods, for example, by making materials with mutual non-compatibility into a solution state in a suitable solvent, and by mixing the materials under heated and melted phase.

In addition, in the above-mentioned stretching alignment processing method, when forming a birefringent film that contains the above-mentioned minute domain in a dispersed state, a target birefringent stretched film may be formed at suitable stretching temperature and at stretching ratio. A stretching temperature is preferably in a range of about ±30° C. of the Tg: glass transition point of base material polymer, and a stretching ratio is preferably about 1.5 to 5. Moreover the above-mentioned base material polymer has anisotropic polymers classified into positive and negative based on a characteristics of refractive index variation by the stretching direction, and both of the positive and negative anisotropic polymers may be used in the present invention.

Target films to which alignment processing is given may be prepared using proper methods, such as a casting method, an extrusion molding method, an injection molding method, and a roll forming method, the flow casting molding method. Moreover, a method may be used in which a developed monomer is polymerized with heat-treatment or radiation processing of UV radiation etc. to obtain a film.

A method in which a mixed solution of a base polymer and the liquid crystal polymer is prepared in some suitable solvent and subsequently the mixed solution is made into a film using a casting method or a flow casting molding method is preferable, because in the method a minute domain contained in a dispersed state in a birefringent stretched film may have an advanced uniform distributed state. When this method is applied, the size and distributed state etc. of the minute domain may be controlled by the factors, such as a kind of solvent, a viscosity of the mixed solution, and a rate of drying of a mixed solution-developing layer. A method of lowering viscosity of mixed solution and a method of increasing the rate of drying of the mixed solution-developing layer etc. are advantageous to make a size of a minute domain considerably small.

Thickness of a film for alignment processing may be suitably determined, and, generally the thickness is 1 μm to 3 mm, preferably 5 μm to 1 mm and still more preferably 10 to 500 μm taking the easiness of alignment processing etc. into consideration. In addition, when the film is formed, proper additives, such as a dispersant, a surface active agent, a UV absorbent, a color tone modifier, a flame retarder, a mold lubricant, and an antioxidant may be blended therein.

Alignment processing may be performed for example, using uniaxial stretching processing method, and also in the case of a high stretching ratio in a direction of a long axis, methods of biaxial stretching, serial biaxial stretching, and Z-axial stretching etc, may also be adopted. Thus a birefringent stretched film containing a minute domain in a dispersed state is obtained using above-mentioned method. In addition, although in the case of a stretching film a brittle polymer may be used as a base material polymer, especially a polymer that is excellent in stretchability is desirable.

An optical diffusing plate of the present invention comprises a birefringent stretched film that contains the above-mentioned minute domain in a dispersed state, and liquid crystal polymer that constitutes the minute domain is aligned perpendicularly to the stretching axis of the birefringent stretched film.

In addition, confirmation of a perpendicular alignment of a side chain type liquid crystal polymer contained in the above-mentioned optical diffusing plate is performed by the following method. Infrared absorption spectrums of optical diffusing plate for polarized lights both in the parallel direction and the perpendicular direction to a stretching axis are measured, and an absorption ratio ((a signal absorption in case of parallel incident light)/(a signal absorption in case of perpendicular incident light)) of infrared dichroism is calculated. When the above-mentioned absorption ratio is smaller than one, it is determined that a perpendicular alignment is obtained. When the above-mentioned absorption ratio is larger than one, it is admitted that horizontal alignment is obtained, and when it is equal to one no alignment is obtained.

On the assumption of the above-mentioned backscattering and the wavelength dependability, etc. in order to solve various problems of, such as, increasing optical use efficiency, preventing chromaticity caused by wavelength dependability, preventing inhibition of clear display by viewing of the minute domain, and further increasing film productivity and film strength, a preferable size of the minute domain, especially a length in the stretching axis direction (direction in the long axis), is 0.05 to 500 μm, more preferably 0.1 to 250 μm and still more preferably 1 to 100 μm. In addition, a minute domain usually exists in a birefringent stretched film in a state of domain and there is especially no limitation about the length in the orthogonal direction (the direction of short axis) to the stretching axis, but the length in the direction of long axis is longer than in the direction of short axis, since a stretching ratio in the direction of long axis is larger than that of short axis.

The percentage for a minute domain in an optical diffusing plate of the above-mentioned present invention, taking a film strength etc. into consideration, is generally 0.1 to 70 weight %, preferably 0.5 to 50 weight % and more preferably 1 to 30 weight %.

An optical diffusing plate of the present invention may comprise a single layer of birefringent film containing minute domains in a dispersed state having different birefringent characteristics as is shown in FIG. 1, and may comprise a laminated multi-layer of the optical diffusing plate 1 as is show in FIG. 2. A cumulative scattering effect beyond increase in thickness is demonstrated using such laminating method, and when combined with a polarizing plate, a larger amount of transmitted light through polarizing plate than reflection loss may be advantageously obtained.

A laminated multi-layer may be a laminated body of the optical diffusing plate at arbitrary configuration angles in the direction of stretching axis, or in the direction orthogonal to stretching axis. In order to increase a scattering effect, however, it is preferable that the upper and lower layer maybe laminated to have a parallel relationship with their stretching direction. The number of lamnating of the optical diffusing plate may be a proper number of two or more.

Each optical diffusing plate in laminated multi-layer may only be piled up without any treatment, but preferably may be adhered through an adhesive layer etc. in order to prevent that the direction of stretching axis etc. might shift or any foreign matter etc. might enter into each interface. Proper adhesives, such as, for example, hot melt type and pressure sensitive adhesion type, may be used for adhesion. In order to reduce reflective loss, adhesive layer that has as small as refractive index difference with optical diffusing plate is preferable, and adhesion may also be carried out using the base material polymer itself or the liquid crystal polymer that forms the minute domain.

An optical diffusing plate of the present invention, making efficient use of the characteristics showing transmittance and scattering properties of linearly polarized light, may be used, for example, in various kinds of uses, such as a polarization amplification plate, color controlling panel, polarized light separation plate, display characteristics control plate, and liquid crystal display screen, and polarized light auxiliary plate.

A polarized light separation plate has the following functions: after canceling the polarization of backscattering light by configuring an optical diffusing plate giving a scattering approximately equal to Rayleigh scattering between a light leading plate and a polarizing plate, the amount of linearly polarized light having transmittance in a direction orthogonal to stretching axis is increased by having the backscattering light re-enter into the polarizing plate through a reflective layer in a light leading plate bottom etc. to improve the polarizing degree and light use efficiency.

A display characteristics control plate is used for the purpose that white display is scattered and black display is transmitted to make contrast and clarity of picture improved, by configuring an optical diffusing plate which has a few backscattering and a high haze anisotropy between a liquid crystal cell and a polarizing plate in the viewing side. A liquid crystal display screen aims at improvement in contrast, using an optical diffusing plate as a screen transmitting selectively a specified linearly polarized light in incident light. A polarized light auxiliary plate is used for the purpose of controlling absorption of incident light by a polarizing plate and preventing temperature rise of the polarizing plate by configuring an optical diffusing plate having a high haze anisotropy between the polarizing plate and light sources inside of a display.

Figure 3:
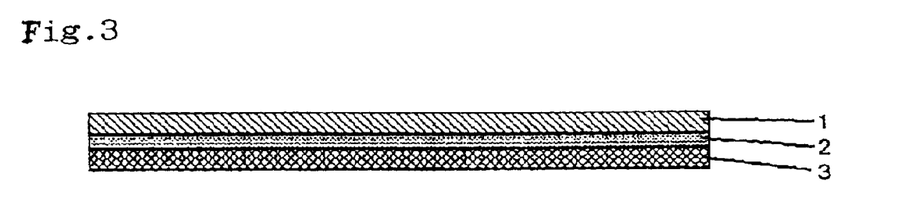
FIG. 3 is a sectional view of an example of an optical element.

Therefore, in practical use, an optical diffusing plate of the present invention may also be used as an optical element that comprises a laminated material in which an optical diffusing plate is configured at one side or both sides of suitable optical parts, such as a polarizing plate and/or a retardation plate. An example is shown in FIG. 3. Notation 3 is an optical part. This laminated layer may only be piled up without any treatment, and may also be adhered through an adhesive layer etc. As an adhesive layer, the adhesive layer used in laminating of each above-mentioned optical diffusing plate may be used.

There is especially no limitation in optical parts used for the above-mentioned lamination and, for example, proper parts, such as a polarizing plate, a retardation plate, a backlight such as a light leading plate, a reflective plate, a polarized light separation plate that comprises multilayer film, etc., and a liquid crystal cell, maybe used. Moreover, optical parts, such as a polarizing plate and retardation plate, may be of various kinds of types.

That is, as a polarizing plate, various kinds of types, such as an absorbing type, a reflecting type, and a scattering type, may be used; and as a retardation plate, various kinds of types, such as a quarter wavelength plate, a half wavelength plate, an uniaxial and biaxial stretched film type, and an oblique alignment film type aligned further in thickness direction, a liquid crystal polymer type, and a type in which the above-mentioned types are laminated may be used in the present invention.

As examples of the polarizing plate described above, a polyvinyl alcohol series film; a partially formalized polyvinyl alcohol series film; an absorbed type polarizing plate in which dichroism substances, such as iodine and a dichroism dye, domainbsorbed in a hydrophilic polymer films like a partially saponified film of ethylene/vinyl acetate copolymer series polymer and subsequently stretched; a poly-ene aligned film such as a dehydrated compound of polyvinyl alcohol; or a dehydrochlorinated compound of polyvinyl chloride etc. may be mentioned.

Moreover, a polarizing plate on which a transparent protective layer comprising a coated layer of plastics and a laminated layer of a film etc. are prepared in order to retain water resistance on one side or both sides of the above-mentioned polarizing film. Furthermore, a polarizing plate with a fine concavo-convex structure on the surface may be mentioned in which transparent fine-grains having an average grain size of 0.5 to 20 $\mu$m, such as inorganic fine-grain, which may have conductivity, of silica, alumina, titania, zirconia, tin oxide, indium oxide, cadmium oxide, antimony oxide, etc., and organic fine-grain of cross-linked or non cross-linked polymer, in the transparent protection layer are contained.

On the other hand, as examples of a retardation plate, a stretched film comprising base material polymer shown in the example of the above-mentioned birefringent film, a liquid crystal polymer, and most of all a retardation plate comprising a twist aligned liquid crystal polymer etc. may be mentioned. Furthermore, as an example of a light leading plate, a light leading plate may be mentioned wherein light sources, such as a linear light source as a cathode-ray tube (cold or hot type), a light emitting diode and EL, are configured on the side of a transparent resin plate, and a constitution in which the light transmitted inside of a plate is emitted from one side of the resin plate by the action of diffusion, reflection, diffraction, interference, etc. is adopted.

When an optical element containing a light leading plate is assembled, one or more auxiliary means, such as a prism array layer comprising a prism sheet for controlling the emitting direction of light etc., a diffusing plate for obtaining uniform light emission, and a linear light-source holder for leading the emitted light from a light source to the side of a light leading plate, are configured in predetermined positions, such as in upper or lower side and in lateral side, of a light leading plate if necessary to obtain a suitable assembled body.

The laminated layer that forms the optical element of the present invention may be a laminated layer comprising one kind of optical parts, and may be a laminated layer comprising two or more kinds of optical parts. Moreover, for example, in the laminated layer of the present invention, two or more layers of the same kinds of optical parts, such as a retardation plate, may be laminated together, and in this case, the optical parts as a retardation plate etc. may have the same or different characteristics. As for the optical diffusing plate used into the optical element, one or more of plates may be configured on one or both of outer the surface of a laminated layer, or in the proper position outside or inside of laminated layers, such as on one side or both sides, of the optical parts configuring the laminated layer.

In addition, as a polarizing plate for configuring an optical element, in order to improve brightness or contrast, a polarizing plate with high polarizing degree such as an absorbed type polarizing plate containing the above-mentioned dichroism substance etc., especially a polarizing plate with 40% or more of light transmiittance, and with 95.0% or more, preferably 99% or more of polarizing degree is used.

Figure 4:
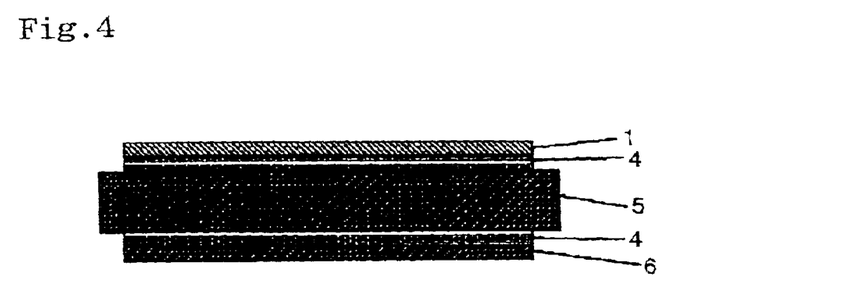
FIG. 4 is a sectional view of an example of a liquid crystal display.
Figure 5:
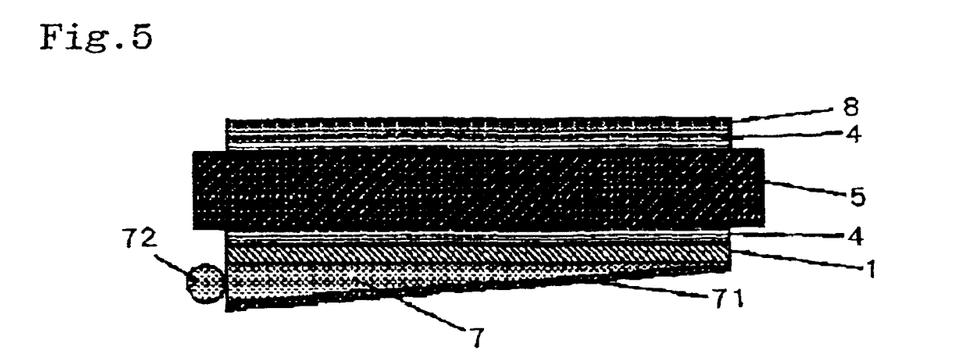
FIG. 5 is a sectional view of other example of a liquid crystal display.

Since the optical diffusing plate and optical element of the present invention have the above-mentioned feature, they may be preferably used for formation of a liquid crystal display. An example of a liquid crystal display is shown in FIG. 4 and FIG. 5. Notation 4 shows a polarizing plate, 5 a liquid crystal cell, 6 a diffuse-reflection plate, 7 a light leading plate, 71 a reflective layer, 72 a light source and 8 shows an optical diffusing plate for diffusing viewing light.

Above-mentioned FIG. 4 illustrates a reflected type liquid crystal display, and an optical diffusing plate 1 is configured on the outside of the polarizing plate 4 in the viewing side. On the other hand, FIG. 5 illustrates a transmitted type liquid crystal display, and an optical diffusing plate 1 is configured between a light leading plate 7 forming a backlight and a polarizing plate 4 in the backside of viewing side.

Generally several composition parts, such as a polarizing plate, a liquid crystal cell, a reflective plate or a backlight, and if necessary other optical parts, such as optical parts, are suitably assembled with a drive circuit incorporated to obtain a liquid crystal display. In the present invention, there is especially no limitation except for the point of using the above-mentioned optical diffusing plate or optical elements, and a liquid crystal display of the present invention may be assembled using conventional method. Therefore, when a liquid crystal display is assembled, suitable optical parts, such as an optical diffusing plate laid on the polarizing plate in the viewing side, an anti-glare layer, an antireflection film, a protection layer, a protection plate, and the compensation plate laid between a liquid crystal cell and polarizing plates in the viewing side, may suitably be configured.

As described above, the above-mentioned compensation plate is used in order to compensate birefringent wavelength dependability etc. and to improve visibility, and is configured between a polarizing plate in the viewing side and/or in the side of a backlight and a liquid crystal cell etc. In addition, as a compensation plate, suitable parts, such as the above-mentioned retardation plate, may be used based on a wavelength region etc. Moreover, the compensation plate may comprise two or more layer of retardation layers. In the above case, one layer or two or more layers of optical diffusing plate or an optical element, being considered as one unit, may be configured in the suitable position on one side or both sides of a liquid crystal cell.

In addition, when the above-mentioned optical diffusing plate is configured, the optical diffusing plate may be used, as mentioned above, as an optical element laminated and combined with adjacent optical parts etc. Moreover, in a liquid crystal display, each composition element may preferably be adhered and combined through adhesive layers as in the case of the above-mentioned optical diffusing plate of the present invention.

EXAMPLE

The present invention is explained below referring to examples below; the present invention is not limited to these examples. In addition, a part in each example represents weight part.

Example 1

A 25 weight % toluene solution containing 100 parts of norbornene series resin (brand name Zeonex, by Nihon Zeon Corporation) comprising hydrocarbon as base material polymer of a birefringent stretched film and 6 parts of a side chain type liquid crystal polymer represented by the formula [Formula 5] shown below (where n=35, in molar % of monomer unit, shown in block for convenience, weight average molecular weight: 10000) were mixed together. A film with a thickness of 100 μm was obtained from the mixed solution by casting method. The film obtained was stretched at a stretching ratio of three at 160° C. to obtain an optical diffusing plate comprising a birefringent stretched film that contains the minute domain of the above-mentioned side chain type liquid crystal polymer in a dispersed state.

[Formula 5]

In the above-mentioned birefringent stretched film, a norbornene series resin forms a film, in which a side chain type liquid crystal polymer is dispersed having a shape of a domain in the form with a long axis in the stretching direction to form a minute domain. Using a method of observing chromaticity caused by a difference in phase difference resulting from a minute alignment turbulence in a liquid crystal polymer within a domain, a measuring was carried out using a polarization microscope to obtain an average diameter of the domain. The result gave about 6 μm as a length in the direction of a stretching axis. Moreover, the length in the direction of a stretching axis was longer than in the direction orthogonal to stretching axis.

Comparative Example 1

The same method was followed as in Example 1 to obtain an optical diffusing plate except that a norbornene series resin containing ester group (a product made by JSR Corporation, brand name ARTON) was used as a base material polymer of a birefringent stretched film in Example 1. In the above-mentioned birefringent stretched film, a norbornene series resin forms a film, in which a side chain type liquid crystal polymer is dispersed having a shape of a domain in the form with a long axis in the stretching direction to form a minute domain. Chromaticity caused by phase difference was measured using a polarization microscope, and an average diameter of the domain was obtained. The result gave about 6 μm as a length in the direction of a stretching axis. Moreover, the length in the direction of a stretching axis was longer than in the direction orthogonal to stretching axis.

Comparative Example 2

Polyvinyl alcohol was coated on a film comprising a norbornene series resin (made by Nippon Zeon Co., Ltd., brand name ZEONEX) and subsequently a rubbing treatment was further given with rayon cloth to obtain an alignment layer (0.3 μm). After a 25 weight % of cyclohexanone solution of the side chain type liquid crystal polymer represented by the above-mentioned [Formula 5] was coated on the alignment layer, alignment processing with heating was applied at 160° C. to obtain an aligned liquid crystal polymer. The thickness of the liquid crystal aligned layer showed 2 μm.

(Evaluation of a Direction of Alignment)

The alignment of the side chain type liquid crystal polymer contained in each sample was estimated for the optical diffusing plate obtained in Example and for the film having the liquid crystal aligned layer obtained in Comparative Example using a method of measuring an infrared absorption spectrum for every polarized light component. An infrared absorption spectrum of the polarized light in a direction parallel and perpendicular to a stretching axis was measured for the optical diffusing plate obtained in Example. Incidence of a polarized light in a direction parallel and perpendicular to a rubbing axis was given, and an infrared absorption spectrum was measured for the film having a liquid crystal aligned layer obtained in Comparative Example. The absorbance resulting from a cyano group ($2230\ cm^{-1}$) and an aromatic ring ($1600\ cm^{-1}$) in the spectrum was measured under the conditions for each above-mentioned direction. Thus, an absorption ratio of infrared dichroism ((signal absorption in case of incident parallel polarized light)/(signal absorption in case of incident perpendicular polarized light)) was calculated. When the above-mentioned absorption ratio is smaller than one, it is admitted that perpendicular alignment is obtained. When the above-mentioned absorbance ratio is larger than one, it is admitted that horizontal alignment is obtained, and when it is equal to one no alignment is obtained. Calculation results of the absorption ratio are shown in Table 1.

TABLE 1

| | Absorption ratio for a cyano group signal | Absorption ratio for an aromatic ring signal |
|---|---|---|
| Example 1 | 0.22 | 0.29 |
| Comparative Example 1 | 7.61 | 5.57 |
| Comparative Example 2 | 7.34 | 5.30 |

Table 1 shows that the absorption ratios of each polarized light component in Example and in Comparative Example are reversed. Therefore, both of the side chain type liquid crystal polymers have the reversed alignment direction of, and it is admitted that an perpendicular alignment is obtained in Example.

Example 2

An optical diffusing plate obtained in Example 1 and a commercially available polarizing plate that has 41% of total light transmittance, and 99% of polarizing degree of a transmitted light were adhered through an acrylics series adhesive layer so that the direction of a stretching axis and the transmission axis might correspond, and an optical element was manufactured.

Example 3

A polarizing plate, a TN liquid crystal cell, and the optical element obtained in Example 3 were adhered one by one through an acrylic series adhesive layer on a diffuse reflection plate so that the polarizing plate might be configured at the cell side, and a reflected type liquid crystal display illustrated in FIG. 4 was obtained. In addition, the polarizing plate was configured so that the direction of a transmission axis might correspond with each rubbing direction that meets a liquid crystal cell.

As a result of investigating brightness in a displaying state with a brightness meter for the liquid crystal display obtained in Example 3, a significant improvement in brightness was confirmed compared with the case where only a polarizing plate was used.

What is claimed is:

1. An optical diffusing plate comprising a birefringent film and a minute domain with a birefringent characteristic different from the birefringent film in a dispersed state in the birefringent film, wherein the birefringent film comprises a birefringent stretched film, and the minute domain comprises a positive uniaxial liquid crystal polymer, further wherein a length of the minute domain in a direction of stretching axis is longer than a length in a direction orthogonal to the stretching axis, and the liquid crystal polymer is aligned perpendicularly to a stretching axis of the birefringent stretched film.

2. The optical diffusing plate according to claim 1, wherein the positive uniaxial liquid crystal polymer is a side chain type liquid crystal polymer comprising a monomer unit (a) containing liquid crystalline fragment side chain and a monomer unit (b) containing non-liquid crystalline fragment side chain.

3. The optical diffusing plate according to claim 1, wherein the minute domain is distributed in a dispersed state caused by phase separation, and a length in the direction of stretching axis of the minute domain is 0.05 to 500 μm.

4. An optical diffusing plate comprising two or more of the optical diffusing plates according to claim 1 being laminated so that a direction in stretching axis of an upper and a lower layer may have a mutually parallel relationship.

5. An optical element comprising a laminated layer of at least one kind selecting from a polarizing plate and a retardation plate, and the optical diffusing plate according to claim 1.

6. A liquid crystal display comprising the optical diffusing plate according to claim 1 on one side or both sides of a liquid crystal cells.

7. The optical diffusing plate according to claim 2, wherein the monomer unit (a) is represented by the following general formula (a) and the monomer unit (b) is represented by the following general formula (b):

General formula (a)

General formula (a)

wherein, $R^1$ represents hydrogen atom or methyl group, a represents a positive integer of 1 to 6, $X^1$ represents —$CO_2$-group or —OCO-group, $R^2$ represents cyano group, alkoxy group with 1 to 6 of carbon, fluoro group, or alkyl group with 1 to 6 of carbon, and b and c represents integer of 1 or 2, respectively,

General formula (b)

General formula (b)

wherein, $R^3$ represents hydrogen atom or methyl group, $R^4$ represents alkyl group with 1 to 22 of carbon, fluoro alkyl group with 1 to 22 of carbon, or a substituent represented by the following general formula (c), General formula (c)

General formula (c)

wherein, d represents a positive integer of 1 to 6 and $R^5$ represents alkyl group with 1 to 6 of carbon.

8. The optical diffusing plate according to claim 1, wherein the birefringent film contains a base material polymer selected from the group consisting of polyester polymers, styrene polymers, olefin polymers, carbonate polymers, acrylics polymers, vinyl chloride polymers, cellulose polymers, amide polymers, imide polymers, sulfone polymers, polyether sulfone polymers, polyether ether ketone polymers, poly phenylene sulfide polymers, vinyl alcohol polymers, vinylidene chloride polymers, vinyl butyral polymers, allylate polymers, poly oxy methylene polymers, and blended mixtures thereof.

9. The optical diffusing plate according to claim 8, wherein the base material polymer is a polymer comprising hydrocarbon without any polar group.

10. The optical diffusing plate according to claim 3, wherein the length in the direction of stretching axis of the minute domain is from 1 to 100 μm.

11. A liquid crystal display comprising the optical element according to claim 5 on one side or both sides of a liquid crystal cells.

* * * * *